United States Patent [19]

Gomez et al.

[11] Patent Number: 4,901,503

[45] Date of Patent: Feb. 20, 1990

[54] APPARATUS FOR SEPARATING AND PACKAGING PLASTIC PARTS

[75] Inventors: Enidio A. Gomez, Miami; Robert J. Downey, Miami Lakes, both of Fla.

[73] Assignee: Security Plastics, Inc., Miami Lakes, Fla.

[21] Appl. No.: 217,358

[22] Filed: Jul. 11, 1988

[51] Int. Cl.$^4$ .......................... B65B 5/10; B65G 53/50
[52] U.S. Cl. ...................................... 53/244; 406/156; 425/215; 425/436 R
[58] Field of Search .................. 264/37; 425/215–217; 53/244, 249; 141/67; 406/155, 156, 157, 134, 122, 151; 11/436, 554, 556, 444

[56] References Cited

U.S. PATENT DOCUMENTS

| | | | |
|---|---|---|---|
| 2,995,775 | 8/1961 | Schnitzius et al. | 425/217 |
| 3,163,470 | 12/1964 | Brewin et al. | 302/28 |
| 3,207,559 | 9/1965 | Poteat et al. | 406/156 |
| 3,246,932 | 4/1966 | White | 406/151 |
| 3,418,694 | 12/1968 | Strauss | 264/37 |
| 4,045,091 | 8/1977 | Beneke | 302/28 |
| 4,067,826 | 1/1978 | Emery | 264/DIG. 69 |
| 4,394,259 | 7/1983 | Benny et al. | 406/151 |
| 4,422,810 | 12/1983 | Boring | 406/156 |

FOREIGN PATENT DOCUMENTS

1039485 8/1966 United Kingdom .............. 406/156

Primary Examiner—Willard Hoag
Attorney, Agent, or Firm—Malloy & Malloy

[57] ABSTRACT

An assembly for the receiving of a plurality of plastic parts initially interconnected to one another by runner structures in an array and formed from a multi-cavity plastic mold such that the subject assembly separates the plastic parts from the runner structure, ejects and delivers the runner structure into a recycling assembly and concurrently but independently delivers each of the plastic parts into separate containers through the provision of a delivery structure associated with the subject assembly.

16 Claims, 6 Drawing Sheets

APPARATUS FOR SEPARATING AND PACKAGING PLASTIC PARTS

BACKGROUND OF THE INVENTION

1. Field of the Invention

The present invention relates to the receiving, of a plurality of plastic parts from a mold and automatically delivering such parts to receiving and/or packaging containers for further processing.

2. Description of the Prior Art

Use of multi-cavity molds such as used in plastic injection molding machines is of course well known in the prior art. Typically, such machines utilize plastic, heated to a flowable form and forced throughout each of the cavities until they are filled. Plastic material runners serve to interconnect the plurality of parts and the runners and parts are ejected from the mold in interconnected relation to one another in what may be considered an array of parts. The number of plastic parts of course are proportional in number to the number of cavities of the multi-cavity machine.

One problem existing in the plastic molding industry is the separation of the plastic parts from the initially interconnecting runner structure in a manner which will facilitate the separation and individual packaging of parts without any runner portion still being attached. It has been common in the prior art to perform the above process using manual techniques and a plurality of workers to manually strip the parts and place them in storage or shipping containers.

There is of course a need in the industry for means to automatically, through cooperative and accurate machinery, separate the parts from one another and from any initially interconnecting runner structure once they are ejected from the plastic mold as set forth above.

Such a preferred assembly would therefore be positionable into a receiving position to first receive the parts and the runner from the mold and then maintain the runners separated from the plastic parts during delivery of the plastic parts to storage containers. Further, a preferred assembly would then serve to deliver the separated plastic parts into individual packaging and/or storage containers preferably independently of one another while still allowing numerous ones of the parts to be collected in bulk.

Typically, one method of separating and/or delivering parts, whether they be plastic parts or formed of other materials, is the use of compressed air or like pressurized fluid which serves to effectively "blow" the parts from their point of ejection to their point of intended delivery. Patents representative of the handling, dispensing and/or delivery of a plurality of various types of parts or products include the Brewin et al, U.S. Pat. No. 3,163,470 disclosing a pneumatic system to dispatch lightweight articles, such as hosiery, through a plurality of various independent and separate conduits downstream to different specifically intended locations. The structure disclosed in this patent, of course, is not directed to any type of receiving, stripping, ejection, etc. of plastic parts from a runner structure per se.

The patent to Boring, U.S. Pat. No. 4,422,810 is directed to a pneumatic system to dispatch granular material through various conduits to different locations. Again, there is no ejection feature associated with the development of pressurized fluid such as air under pressure to plastic parts which have been previously separated from one another and from any initially supporting runner structure.

The patent to Beneke, U.S. Pat. No. 4,045,091 is directed to a device for the pneumatic feeding of a quantity of cards by means of deposit chutes lined-up in registry with the individual ones of the cards which are connected individually to a pneumatic feed line.

The Poteat et al, U.S. Pat. No. 3,207,559 discloses a means for dispatching items again of the hosiery type through pneumatic conduits under pressure fluid or compressed air to a central station where they are separated according to size and/or other requirements.

While the development and advancement of the prior art are represented in the above-noted patents, none of these patents disclose a system for the dispatching of molded parts of various quantities, sizes and shapes through a pneumatic system with the inclusion of an assembly which will receive plastic parts still initially interconnected by runner structures to one another from a mold and then maintain the various parts separate from the runner structure and from one another for delivery, individually, to separate locations such as but not necessarily to packaging and/or storage containers.

SUMMARY OF THE INVENTION

This invention relates to an assembly for the receiving of a plurality of interconnected plastic parts from a plastic mold through the provision of a collector means movably mounted to travel on a base both in a vertical direction along the length of the base and also transversely substantially outwardly from the base into a receiving position relative to the parts issuing portion of the mold. The collector means of the present assembly includes a plurality of chambers proportional in number to the number of plastic parts being ejected from the mold such that each part of a given array of parts is received in an independent chamber. Once the parts are received, the collector means is moved into an ejector position and subsequently to a delivering position for the transfer of the collected plastic parts, by means of subjecting them to compressed air, causing the "parts" to be blown from the individual receiving chambers defining the collector means into a delivery assembly.

It should be emphasized that throughout a description of the preferred embodiment of the present invention as set forth herein, compressed air or like fluid is used as the "driving force" for the transfer of parts and/or the runner structure between the various components of the subject assembly. It should be noted however, that means other than compressed air or any type of compressed fluid could be utilized to transfer the plastic parts and the runner structure, when such runner structure exists, and still be within the intended scope of the present invention.

The delivering assembly includes a plurality of individual conduits or tubes initially disposed in aligned registry with the chambers of the collector means to define a delivery position. In such delivery position, the aforementioned plastic parts are blown, by compressed air, through the tubes to a point of delivery which may preferably be a plurality of containers. It is important to note that the structural features of the subject assembly allow for the individual collection of the plastic parts, and for the individual separated delivery of the parts relative to one another. The size, shape and/or general weight of the plastic parts of course may or may not vary greatly without structural modification of the assembly of the present invention. It should be apparent therefore, that regardless of the size, shape or other structural features of the individual plastic parts, quality control is greatly facilitated since the parts are segregated from one another from the point of leaving the individual respective cavity of a multi-cavity mold in which they were formed by passing into separate chambers of the collector means. From these respective chambers, the individual parts are then transferred along individual delivery tubes, still maintaining their segregated relation to one another, and deposited in the aforementioned packaging and/or storage containers. Therefore, all parts deposited in a given container would be from the same cavity of the multi-cavity mold. Any imperfection in these parts could therefore be easily traced to an imperfection in a given one cavity of the multi-cavity mold.

An ejector means, including an ejector assembly may be incorporated within the subject assembly and be constructed to automatically eject the runner portion of the array of plastic parts from the collector means located adjacent to the entrance of the receiving chambers associated therewith. Accordingly, a plurality of separated parts pass into the collector means from the mold through the face or opening of the plurality of receiving chambers. The runner structure, when one is present, is "caught" on the face without entering the chambers. The runner structure is then ejected from this position for delivery into a recycling assembly. At this point, the runner structure may be ground into a particulate material and fed back into the plastic supply source associated with the molding machine for reuse and the reduction of waste. All of the above features including the positioning of the collector means into the receiving position, delivery position and runner ejector position are accomplished through automatic movement of the collector means relative to the base and molding machine. Therefore, while passing into and out of the various positions required to perform the various features as set forth above, the collector means moves both vertically and transversely relative to the length of the support base and outwardly therefrom into receiving alignment with a parts issuing portion of the mold to receive the plastic parts therefrom.

Another feature of the present invention is the ability to selectively eliminate or modify collection, handling and recycling of the runner structure. It is well known in the molding art that plastic parts are capable of being produced utilizing a "hot manifold" technique wherein the existence of a runner structure is eliminated. The assembly of the present invention could of course be utilized with such prior art techniques and the ejector means for removing a runner structure, as well as the recycling step associated therewith, would of course be eliminated from the subject assembly. Also, when a runner structure is present and in fact received by the collector means, it is possible to modify the subject assembly to accomplish ejection or removal of the runner structure from the collector means for deposit thereof in some type of collection facility for disposal or the like. In such situations, it may be desirable or necessary to use only "original" material in the formation of the plastic parts. Therefore, any recycling of the runner structure would be eliminated. Finally, while a specific structural embodiment of the ejector means is described in greater detail hereinafter, it should be noted that many other types of mechanisms may in fact be utilized to remove the runner structure from its collected and received position on the collector means other than the specific embodiment set forth herein.

The invention accordingly comprises the features of construction, a combination of elements, an arrangement of parts which will be exemplified in the construction hereinafter set forth, and the scope of the invention will be indicated in the claims.

BRIEF DESCRIPTION OF THE DRAWINGS

For a fuller understanding of the present invention, reference is had to the following detailed description taken in connection with the accompanying drawings in which.

DETAILED DESCRIPTION OF THE PREFERRED EMBODIMENT

As shown in FIGS. 1 through 8, the assembly of the present invention is generally indicated as 10 and comprises an upstanding base 12 having an elongated substantially upright vertical orientation supported by a base plate structure 14 which is fixed to and mounted on a floor or other supporting member.

The assembly comprises a collector means generally indicated as 16 including a collector housing 20 movably supported both vertically and transversely relative to the length of the base 12 as will be explained in greater detail hereinafter.

The collector means 16 and more specifically the housing 20 is movably supported on the base 12 by a movable carriage generally indicated as 22. The carriage 22 is movable along the vertical length of the base 12 on support rods 24 and 24'. The carriage 22 may be pneumatically driven and may comprise an air cylinder 18. The carriage 22, in addition to the air cylinder 18, further includes a support portion 23 fixed to the cylinder 18 and further fixed to elongated upwardly extending arm member 25. The upper or distal portion of the arm member 25 is defined by an outwardly extending finger as at 25' which is disposed in lifting engagement with the upper end 27' of the bearing rods 27. The bearing or support or support rods 27 in fact move longitudinally of the base 12 with the carriage structure 22. Further, as shown in each of the FIGS. 1 through 5, the collector means 16 including the housing 20 is fixed to move both vertically and transversely with the connector rods 27 due to a fixed interconnection therebetween as at 29 (see FIG. 7). Accordingly, as the carriage assembly 22, including the support portion 23, arm 25 and support or bearing rods 27 move vertically relative to the length of the base 12, so will the collector means 16 and housing 20 thereof so as to accomplish proper positioning of the collector housing 20 relative to the mold generally indicated as 100 as shown in FIGS. 2, 3, 4 and 5.

Figure 1:
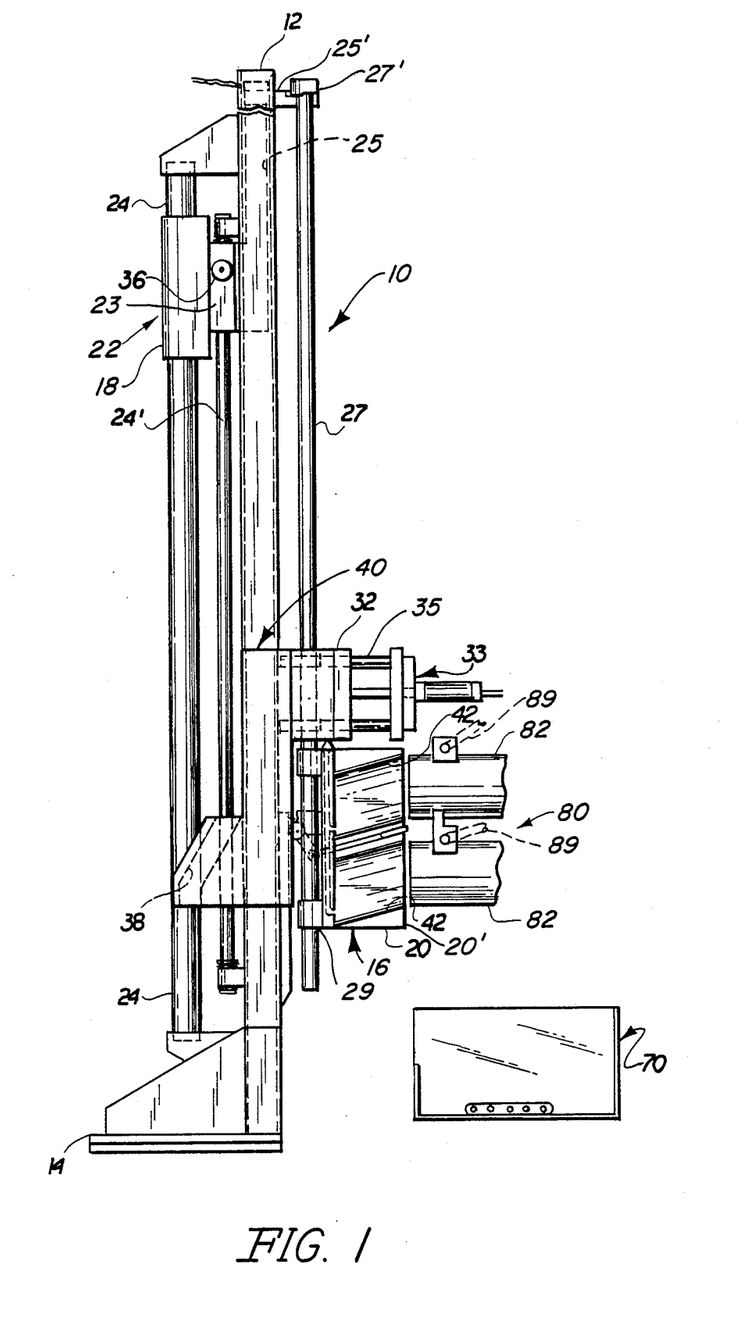
FIG. 1 is a side elevational view of one embodiment of the subject assembly in partial cut-away.
Figure 2:
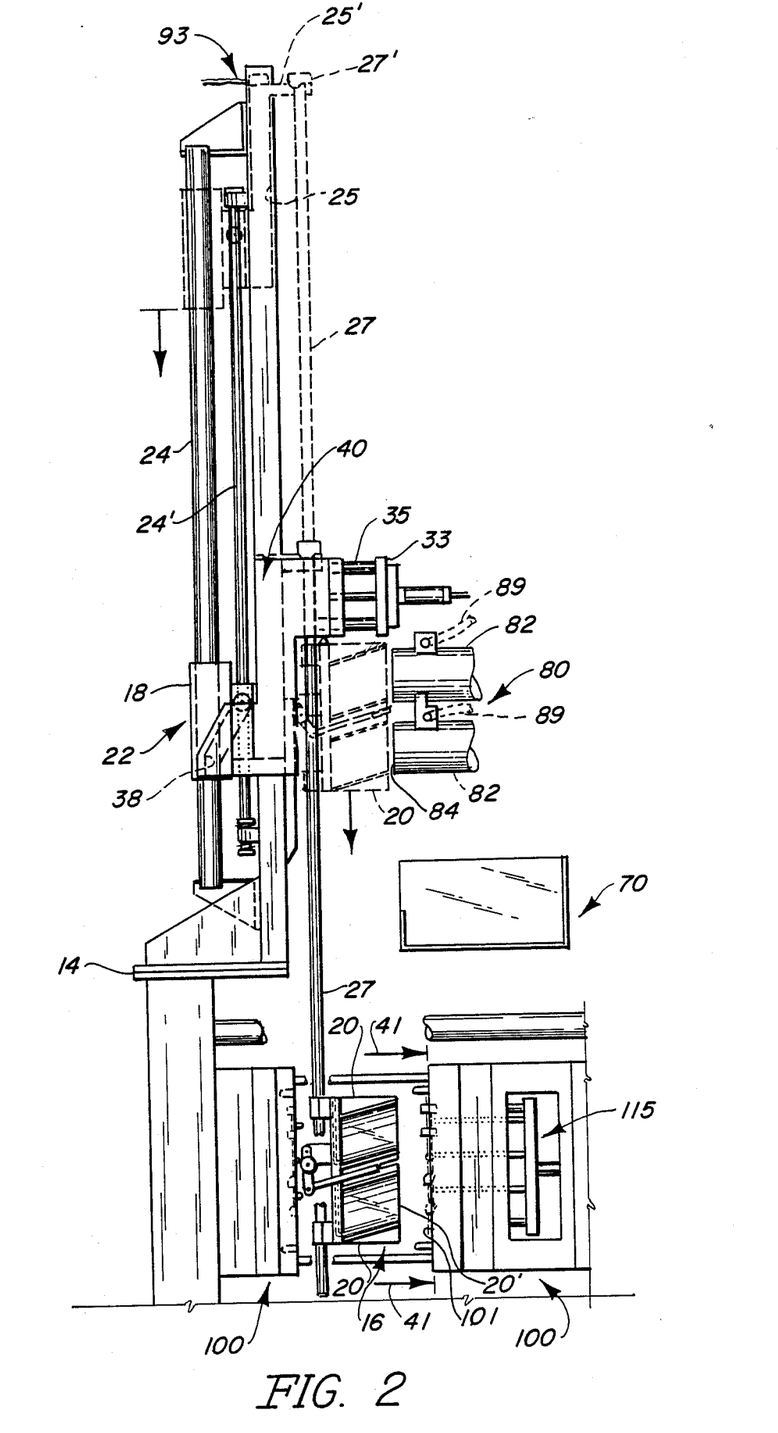
FIG. 2 is a side elevation of the present invention in partial cut-away and shown in cooperative position relative to a molding machine.
Figure 3:
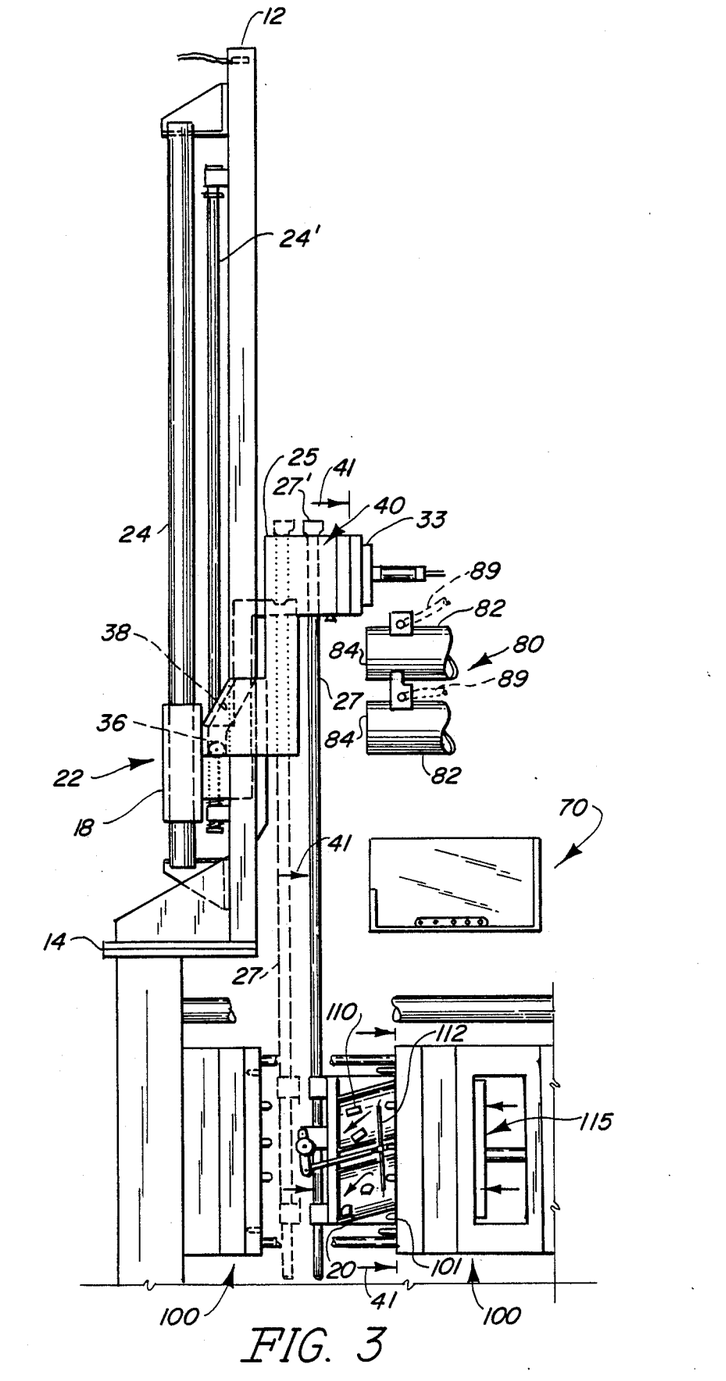
FIG. 3 is a side elevation of the embodiments of FIGS. 1 and 2 in partial cut-away and phantom showing a different position of components of the subject assembly relative to the molding machine.

With reference primarily to FIGS. 2 and 3, the collector means 16 and housing 20, also moves transversely relative to the length of the base 12 and into and out of a parts receiving position relative to a parts issuing portion or face 101 of the mold 100. More specifically and also with reference to FIGS. 2 and 3, the collector housing 20, as set forth above, is fixed to and travels with the support and bearing rods 27 both vertically and transversely relative to base 12. As the carriage assembly 22 travels downwardly along the length of the base 12 and along the length of the support shafts 24 and 24', two roller cams 36, disposed on opposite sides of the support portion 23, are positioned to engage and pass into and along the length of elongated, angularly oriented receiving channels 38. This forces transverse positioning of sub-assembly 40 and movement thereof transversely to the longitudinal axis of the support base 12. Relative transverse movement of the sub-assembly 40 is permitted wherein the carriage assembly 22 and the support portion 23 thereof is forced to maintain a vertical straight line direction of travel due to its fixed orientation and travel along the length of the support shafts 24 and 24'. Due to the angular orientation of the receiving channels 38 and the straight line vertical direction of travel of the roller cams 36, the sub-assembly 40 will be forced outwardly towards a stop base portion 33. Transverse support rods 35 are disposed in supporting relation to the sub-assembly 40 to facilitate its transverse travel. In that, the collector housing 20 is intended to travel both vertically and transversely along with the elongated support shafts 27, and further in that the support shafts 27 are connected to move transversely with the sub-assembly 40, each of the components including the sub-assembly 40, the support shafts 27 and the collector housing will move transversely in the direction indicated by directional arrows 41. This will bring the face 20' of the collector housing 20 into parts receiving relation to the mold face 101 from which the parts 110 and the runner 112 are ejected by a pushing mechanism generally indicated as 115 associated with the mold 100 as clearly shown in FIG. 3.

Figure 6:
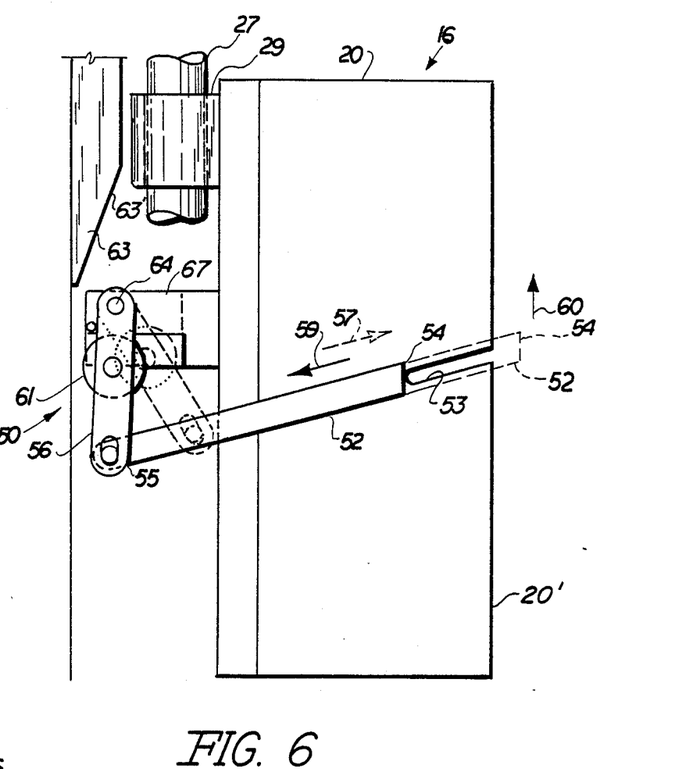
FIG. 6 is a detail view in partial cut-away of one embodiment of the ejector assembly for removal of a runner structure from the plurality of plastic parts formed by the molding machine and its association with a collector assembly of the present invention.
Figure 7:
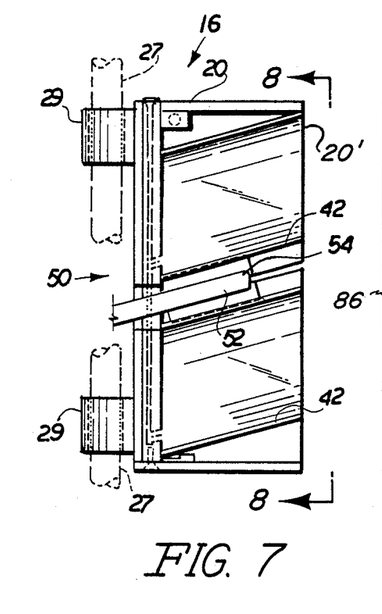
FIG. 7 is a sectional view in partial cut-away and phantom of the embodiment of the ejector assembly and its cooperative relation with the collector assembly.
Figure 8:
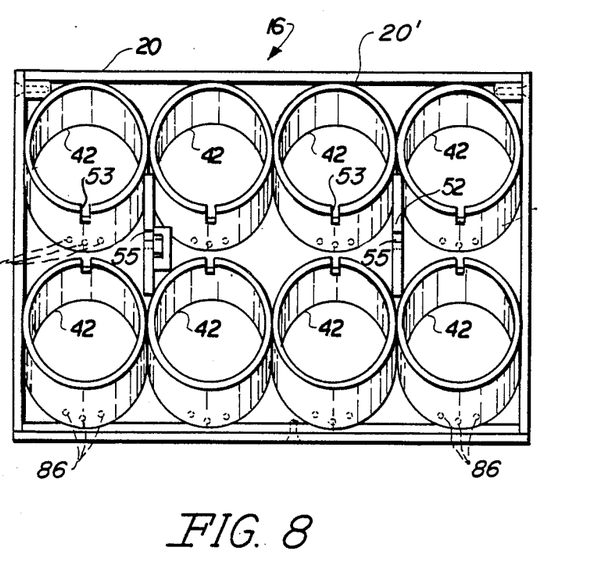
FIG. 8 is a front view of a receiving face of the collector assembly of the present invention as taken along line 8—8 of FIG. 7. Like reference numerals refer to like parts throughout the several views of the drawings.

With regard to FIGS. 7 and 8, it is clearly seen that the collector means 16 including the housing 20, comprises a plurality of open faces or open ended chambers 42 each designed to receive at least one part of an array of parts issuing from the mold 100 as they issue in already separated relation from the face 101 thereof. The number of chambers 42 of course may vary and still be within the intended scope of the present invention. However, the actual number of chambers should be proportional to the number of parts issuing from the multi-cavity mold to insure that each part is placed within a separate chamber 42. Further, it will be noted throughout FIGS. 1 through 7, that each of the chambers 42 is disposed at a somewhat angular orientation relative to true horizontal. This orientation facilitates retaining of the individual parts in the chambers 42 and prevents or prevents or reduces the chance of inadvertent displacement of the parts from the respective chambers which may be caused by vibration of the subject assembly during its normal mode of operation.

The position of the collector means including the collector housing 20 relative to the mold face 101 may define what is referred to herein as the parts receiving position wherein both the parts 110 and the runner 112, already having been separated, are received by the collector housing 20 directly from the mold 100. Naturally, as also shown in FIGS. 2 and 3, the mold 100 must in fact separate from its conventional molding position in order to expose mold face 101 and to lower and transversely orient the collector housing 20 into the receiving position shown in FIG. 3. The sequential steps of this vertical and transverse direction of travel of the collector housing 20 is shown consecutively in FIGS. 2 and 3.

Once the parts 110 and the runner 112 are received on the collector housing 20, the carriage assembly 22 begins its upwardly vertical direction of travel. The roller cams 36 are forced upwardly through and along the length of the receiving channels 38. This will cause both an upward, vertical direction of travel of the housing 20 as well as an inward transverse direction of travel towards the base 12. Accordingly, the collector housing 20 will pass out of the parts receiving position relative to the mold face 101 as best shown in phantom lines in FIG. 4 and as noted in directional arrows 41' and 43.

Figure 4:
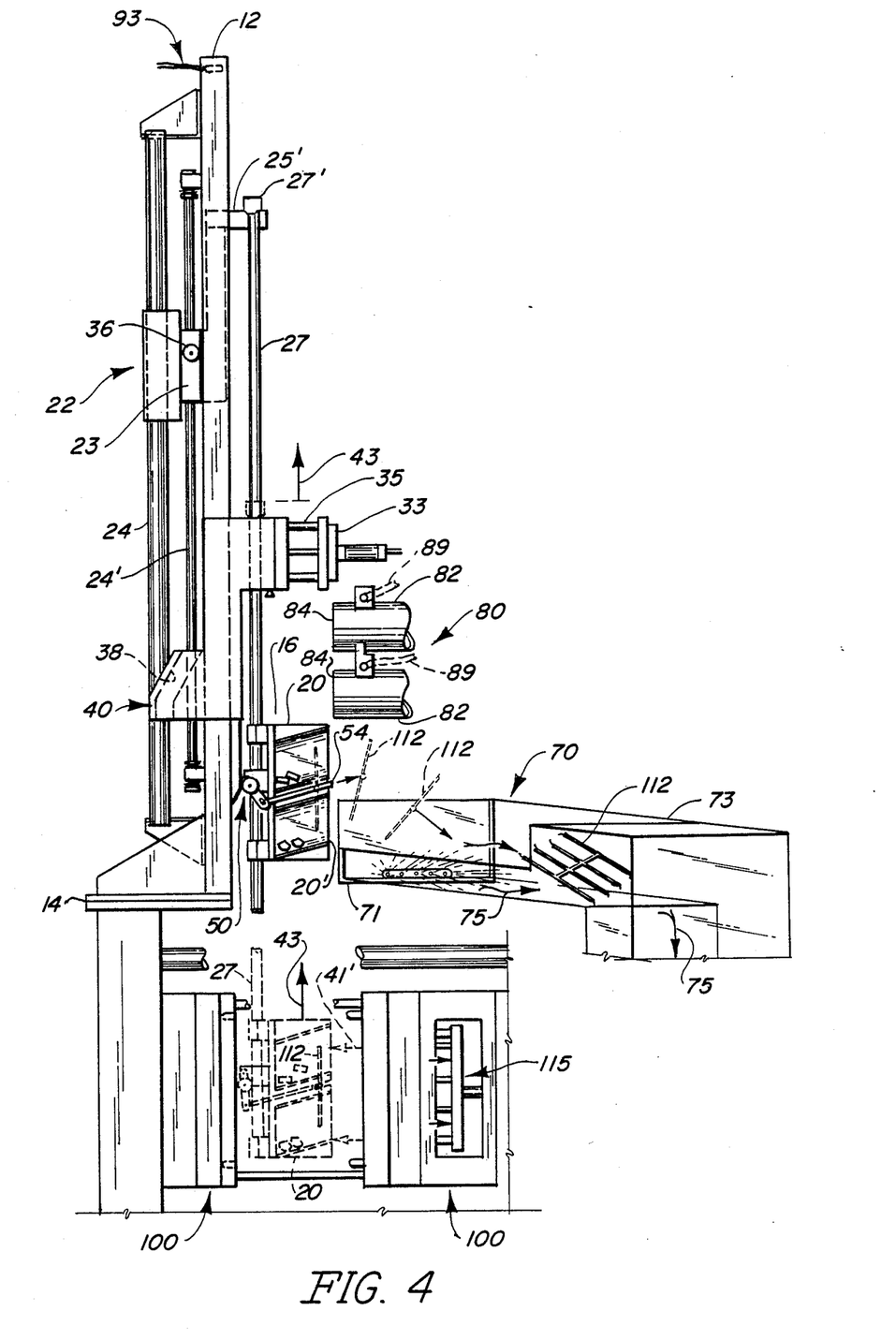
FIG. 4 is a side elevation of the embodiments of FIGS. 1 through 3 in partial cut-away and phantom showing different positions of components of the subject assembly relative to the molding machine and a collection and recycling structure cooperatively disposed relative to the structure of the present invention.

With reference to FIGS. 4, 6 and 7, the subject invention further comprises an ejector assembly generally indicated as 50 and which is disposed and structured to effectively eject or "push" the runner structure 112 from its position generally adjacent the outer face 20' of the collector housing 20. This is accomplished through the provision of an elongated arm 52 having its distal end as at 54 disposed in communicating relation to receiving slots 53 and 55 and any runner structure 112 contained therein. The slots 53 and 55 are disposed to receive the runner 112 therein as it is ejected or passes from the face 101 of the mold 100. When in such position and upon the upward travel of the collector housing 20, the ejector means 50 will be activated to cause an outward direction of travel of the ejector arm 52 in accordance with directional arrow 57. This in turn is accomplished by the interaction by the fixed elongated cam 63, having angled cam surface 63' fixedly positioned for abutting engagement with the roller cam rider 61 which in turn is attached to the pivot arm 56. The arm 56 is pivotally secured at one end 64 to a fixed brace as at 67 secured to the collector housing 20. The upward travel of the collector housing 20 forces the roller cam 61 into engagement with the cam surface 63' thereby forcing an outward direction of travel of the ejector arm 52. The distal end 54 then engages the runner 112 disposed within the slots 53 and 55 causing it to be ejected or kicked out into a runner receiver and recycling assembly generally indicated as 70.

It can be seen in FIG. 4 that the collector housing 20 is at a level or vertical height on the base 12 such that the runner 112, once ejected, may fall into a receiving and recycling assembly 70 including a hopper 71. At this point, it is driven by compressed air or other applicable driving force along a conduct or like conveying structure 73 to a point where it may be re-ground (not shown for purposes of clarity) and eventually recycled once it is in a particulate material back to the plastic material supply for the mold 100. Directional arrows 75 track the path of travel of the runner 112 once it leaves the face or portion of the collector housing 20 to which it is secured after first being ejected from the face 101 of the mold 100.

It should again be emphasized that in certain molding techniques, as set forth above, a runner structure 112 will not be produced, and accordingly, the aforementioned ejector means 50 will not be required or will be selectively rendered inoperative. Alternately, when a runner structure is produced and collected generally on the face 20' of the collector housing 20, it may be ejected into a receiving hopper for purposes of disposal rather than concurrent recycling thereof. In the production of certain plastic parts, it may be desired to use only "original" material. In such cases, the recycling of the collected runner, if such exists, would not be accomplished or alternately if recycling was in fact performed on the collected runner structure, the resulting recycled plastic material could be stored for a later, separate use.

Figure 5:
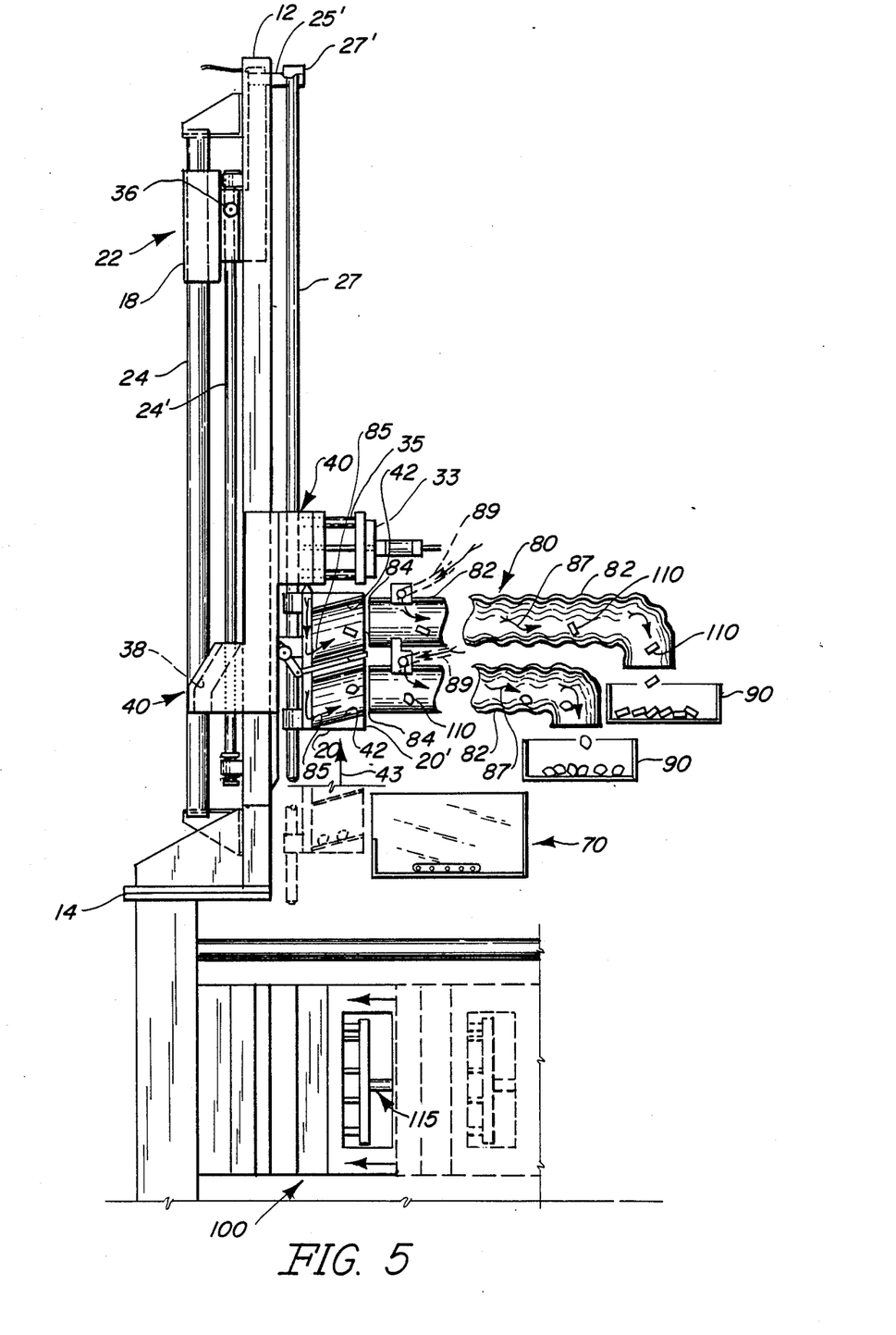
FIG. 5 is a side elevation and partial cut-away and phantom of the embodiments of FIGS. 1 through 4 showing yet another position of the present invention.

The carriage assembly 22, after ejection of the runner 112, continues its upward vertical travel along the base 12 as indicated by directional arrows 43 in FIG. 4. This will cause the collector means 16 and more specifically, the housing 20 to pass from the runner ejecting position as clearly defined in FIG. 4, upwardly into a delivery position relative to the delivery means generally indicated as 80. The delivery means comprises a plurality of separate conduits or tubular members as at 82 which may be formed of a flexible or like material. The receiving end as at 84 of each of the plurality of conveying conduits 82 is in aligned registered position with the open ends of the chambers 42 of the collector housing 20 such that the parts 110 (as clearly shown in FIG. 5) may be forced, as by compressed air, into the open end 84 of the conveying conduits 82. As shown in FIGS. 5 and 8, each of the chambers 42 includes a first drive assembly including one or more nozzles 86 from which compressed air or like driving fluid issues. Once the compressed air blows the parts 110 from the chambers 42 of the collector housing 20, they pass along the length of the delivery conduits 82 to the distal end thereof wherein they are delivered to a plurality of storage and/or packaging containers as at 90. For purposes of clarity, the directional arrows 85 and 87 are representative of the path of the driving pressurized fluid as they respectively enter the chambers 42 and the elongated delivery conduits 82. Pneumatic hoses or lines 89 represent a second drive assembly which is connected to the individual delivery conduits 82 for the delivery of pressurized air to the interior of the conduits for the driving force applied to the parts 110 as set forth above. Activation of a pressurized air supply to force the driving air into both the chambers 42 and the conduits 82 may be accomplished through the provision of a micro switch generally indicated as 93 disposed to engage the upper portion as at 25' of the support arm 25. Once so engaged, activation of the pressurized fluid supply will cause fluid to pass into both the chambers 42 and the conduits 82 in accordance with the aforementioned directional arrows 85 and 87 respectively.

Now that the invention has been described, What is claimed is:

1. An assembly designed to collect and separate an array of a plurality of plastic parts concurrently issuing from a multi-cavity mold and for the distribution of the parts to preselected ones of a plurality of containers, said assembly comprising:
   a. a base having an elongated configuration and disposed adjacent to and in substantially communicating, part receiving relation to a plastic parts mold,
   b. a collector means movably supported on said base and positionable into and out of both a receiving position and a delivering position,
   c. a delivery means disposed in communicating, interconnecting relation between said collector means and a plurality of containers and structured for the channeling and delivering of the plurality of parts to preselected ones of the plurality of containers,
   d. said collector means comprising a collector housing including a plurality of open ended receiving chambers proportional in number to the number of the plurality of plastic parts issuing from the mold in a single array and each of said chambers disposed to receive one of the plastic parts of the array,
   e. said receiving position defined by disposition of said collector means on said base in aligned, parts receiving communication with a parts issuing portion of the mold,
   f. said delivering position defined by aligned, registry of said delivery means with the open ends of said receiving chambers and in parts receiving relation thereto,
   g. drive means mounted at least in part on said collector housing and disposed and structured for transfer of the plastic parts at least between said collector means and the delivery means, and
   h. ejector means connected in cooperative relation to said collector means for ejecting of a runner structure previously attaching the plurality of plastic parts in the array, said ejector means including an ejector assembly disposed in abutting, engageable relation to the runner structure once disposed on the collector means, said ejector assembly structured to displace the runner structure from the collector means.

2. An assembly as in claim 1 wherein said drive means comprises a first drive assembly including a source of pressurized fluid connected to each of said plurality of receiving chambers and disposed to drive parts therefrom into said delivery means.

3. An assembly as in claim 2 wherein said drive means further comprises a second drive assembly including a source of pressurized fluid connected to said delivery means and disposed to drive parts therefrom into the containers.

4. An assembly as in claim 1 wherein said delivery means comprises a plurality of elongated conduits each disposed in aligned parts receiving position to a different one of said chambers when said collector means is in said delivering position.

5. An assembly as in claim 4 wherein said drive means is further connected to each of said plurality of conduits for driving of parts there along, said conduits further positioned in delivering relation to a plurality of the containers.

6. An assembly as in claim 1 wherein said ejector assembly further comprises a runner receiving structure disposed on the collector means and structured to hold the runner at a separated location from the received parts and in engageable relation to a remaining portion of the ejector means.

7. An assembly as in claim 6 wherein said runner receiving structure is mounted adjacent an outer face of said housing and adjacent an open end of said plurality of chambers and in separated relation to the plastic parts within said chambers.

8. An assembly as in claim 6 wherein said ejector assembly comprises a positioning arm having an elongated configuration and an outer extremity disposable into driving, abutting engagement with the runner structure once positioned on said runner receiving structure.

9. An assembly as in claim 8 wherein said ejector assembly further comprises a cam structure mounted on said base and a cam rider connected to said positioning arm and mounted on said collector means and movable with both, relative to said cam structure, said cam structure and cam rider relatively disposed and structured to force driving engagement with one another upon relative movement between said collector means and said base and outward travel of said positioning arm into abutting engagement with the runner structure.

10. An assembly as in claim 9 wherein said positioning arm is pivotally mounted on said collector means and positionable reciprocally between an outer, extended position and a retracted position respectively upon engagement and disengagement of said cam structure and cam rider with one another.

11. An assembly as in claim 10 further comprising a runner collection assembly disposed in receiving relation to the runner structure once ejected from said collector means, said runner collection assembly structured for recycling of separated runners back to the plastic mold.

12. An assembly as in claim 1 further comprising a carriage assembly connected in supporting relation to said collector means and movable along the length of said base as said collector means is disposed between said receiving position and said delivering position.

13. An assembly as in claim 12 wherein said base is disposed in a substantially upright position and said carriage assembly and said collector means are reciprocally movable vertically along the length of said base.

14. An assembly as in claim 12 further comprising orientation means including a drive cam assembly and movable therewith and positionable in receiving engagement with a collector support structure, said collector support structure including a cam receiving channel means correspondingly disposed and configured to receive said driving cam assembly therein.

15. An assembly as in claim 14 wherein said collector means and said collector support structure is movable substantially transversely of said base into said receiving position relative to the parts issuing portion of the mold.

16. An assembly as in claim 15 wherein said drive cam assembly travels in a substantially straight line path along the length of said base, said receiving channel including a length thereof being angularly oriented relative to said straight line path, said collector support and collector means being transversely disposable relative to the length of said base upon engagement between said drive cam assembly and said receiving channel.

* * * * *